Figure 3:
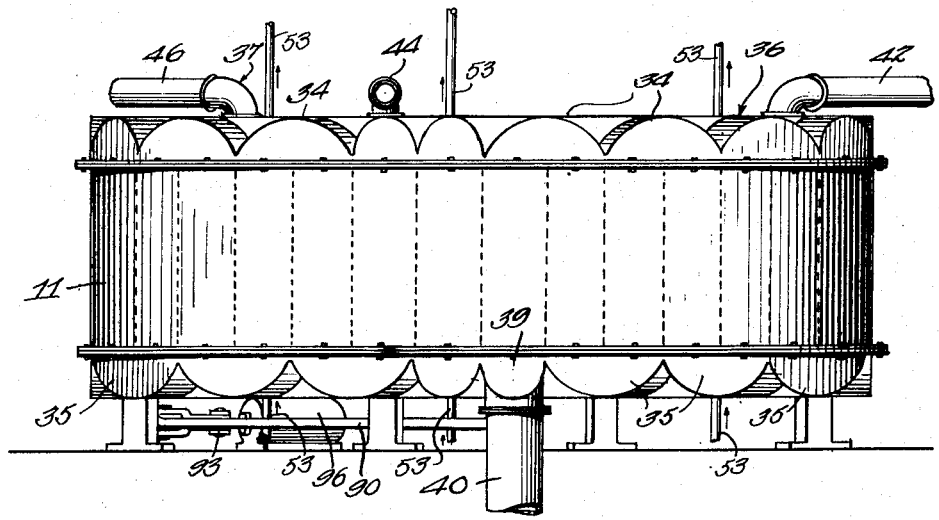

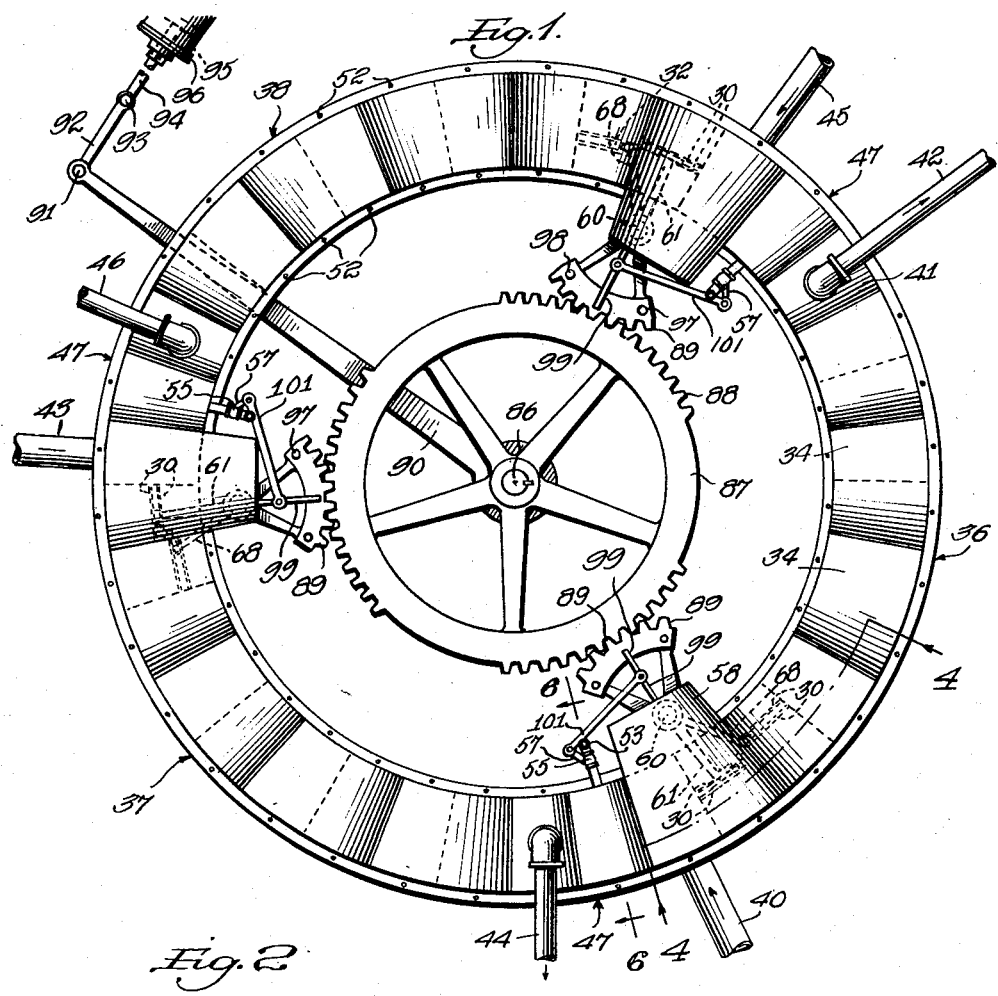
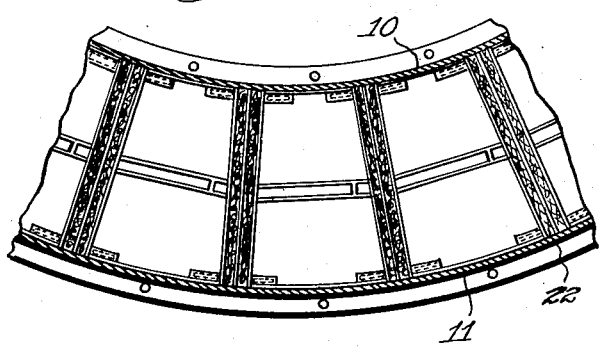
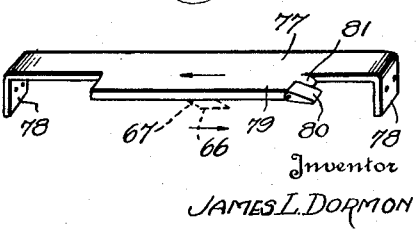

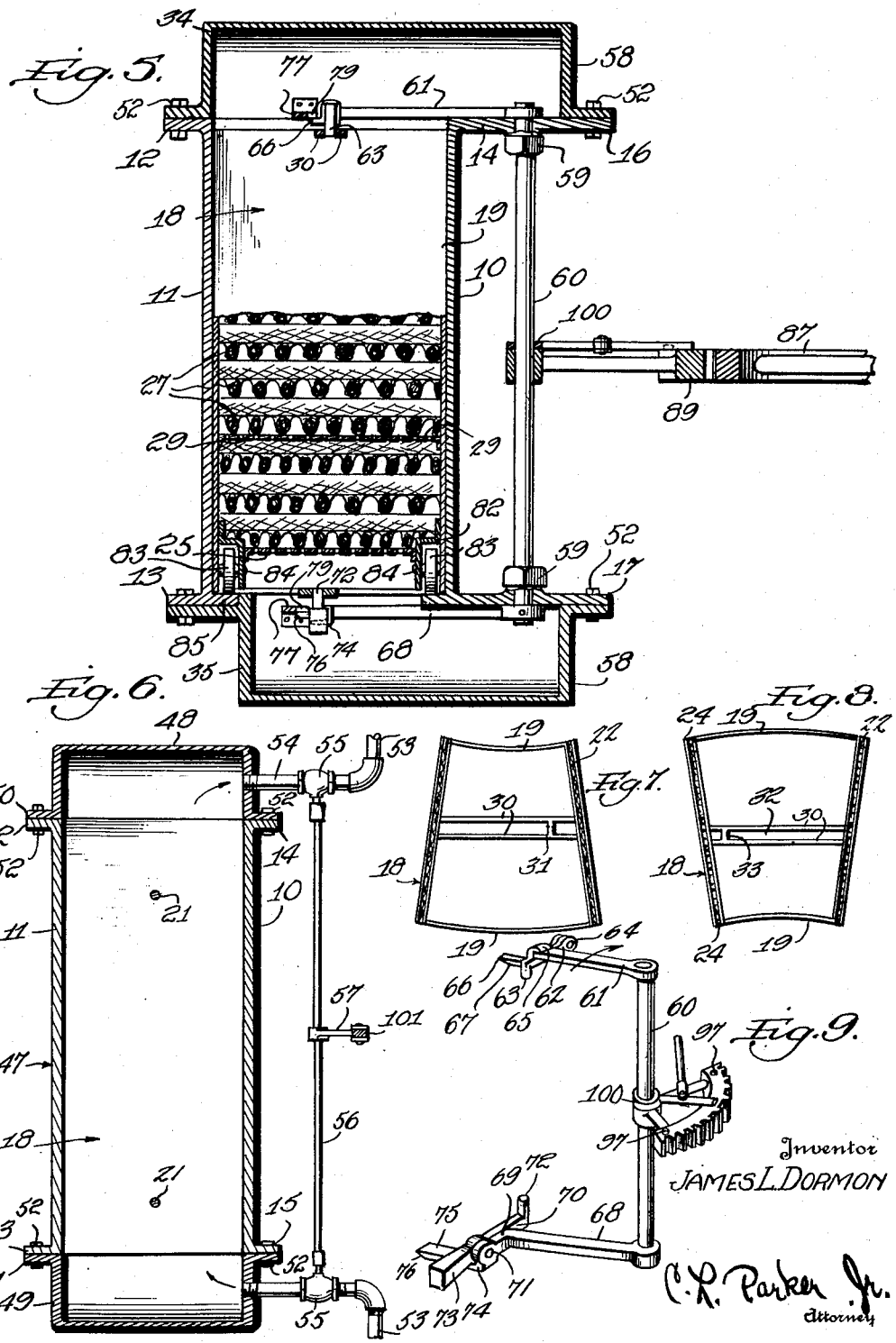

Oct. 27, 1931.  J. L. DORMON  1,828,734
GAS AND VAPOR TREATING APPARATUS
Filed Sept. 13, 1928  3 Sheets-Sheet 3

Inventor
JAMES L. DORMON
By C. L. Parker Jr.
Attorney

Patented Oct. 27, 1931

1,828,734

UNITED STATES PATENT OFFICE

JAMES L. DORMON, OF SHREVEPORT, LOUISIANA, ASSIGNOR TO BASIC PATENTS CORPORATION, OF SHREVEPORT, LOUISIANA, A CORPORATION OF LOUISIANA

GAS AND VAPOR TREATING APPARATUS

Application filed September 13, 1928. Serial No. 305,774.

This invention relates to gas and vapor treating apparatus, and more particularly to an apparatus for removing the sulfur content from gasoline or other light hydrocarbons.

In my copending application Serial No. 305,773, filed September 13, 1928, I have disclosed a process particularly adapted to be practiced with the present apparatus. In the process referred to, gasoline vapors from a suitable still are passed through finely divided catalytically active metals, such as iron, copper, nickel, etc., and preferably nickel to extract sulfur from the hydrocarbon to form the sulfide of the metal employed as the catalyst. The sulfide coated catalyst is then preferably subjected to the action of heated air to form sulfur dioxid gas, which passes off and to form the oxid of the catalytic metal. As the third step of the process the oxidized metal is subjected to the action of hydrogen to reduce the oxid, water vapor being formed and carried away, thus leaving the catalyst in metallic form to be returned to the first stage of the process for the purification of the hydrocarbon.

In the practice of the process, the movement of the catalyst takes place counter to the movement of the various vapors and gases referred to above, and the present invention has to do with an apparatus particularly adapted for practicing the process of desulfurizing hydrocarbons, but is not limited in its application in the chemical arts to such a process.

Heretofore, it has been found to be extremely difficult to remove the sulfur content from gasoline and other hydrocarbons, and particularly to reduce the sulfur content to the point where it is below the maximum amount now permitted by law. The processes now employed for the purpose stated, not only possess the disadvantage of being difficult to practice, but also are relatively expensive, thus greatly affecting the price of the finished product.

The method disclosed in my copending application referred to and the apparatus described and claimed in the present application are particularly advantageous for desulfurizing gasoline for the reason that the apparatus is continuous and self-regenerative in operation and the method may be economically practiced with the apparatus, thus resulting in the production of a cheaper finished product possessing a materially reduced sulfur content.

As a further important object, the apparatus is unitary in character, and provides in its cycle of operation, the three steps referred to above, namely the desulfurization of the gasoline, the oxidation of the metal catalyst, and the reduction of the metallic oxid to finely divided catalytically active metal.

A further object is to provide novel means for defining passages for the various vapors and gases during each stage of the operation of the apparatus.

A further object is to form an annular rotatable member divided into cells which co-act with suitable means to form a single continuous passage for each stage of the apparatus, each continuous passage changing at stated intervals by movement of the rotatable member to move successive cells from one stage to another.

A further object is to provide novel means for effecting intermittent movement of the rotatable member for the purpose stated.

A further object is to provide novel means for flushing the active gases or vapors from successive cells of the rotatable member as they pass from one stage to another.

A further object is to accomplish the result just stated by the introduction through successive cells, as they are moved to points intermediate the several stages, of an inert gas, and to provide novel means controlled by the movement of the rotatable member for cutting off the flow of the inert gas during the movement of the rotatable member.

A further object is to provide a novel form of cell adapted for holding the catalytically active metal while practicing the process.

A further object is to provide stationary return bends for the gases and vapors associated with the top and bottom of the rotatable member, and staggered with respect to each other to form continuous passages for the gases and vapors in each stage of the apparatus.

A further object is to provide an apparatus of the character referred to wherein the various chemical reactions are adapted to take place at atmospheric pressure and at substantially low temperatures.

Other objects and advantages of the invention will become apparent during the course of the following description.

Figure 4:
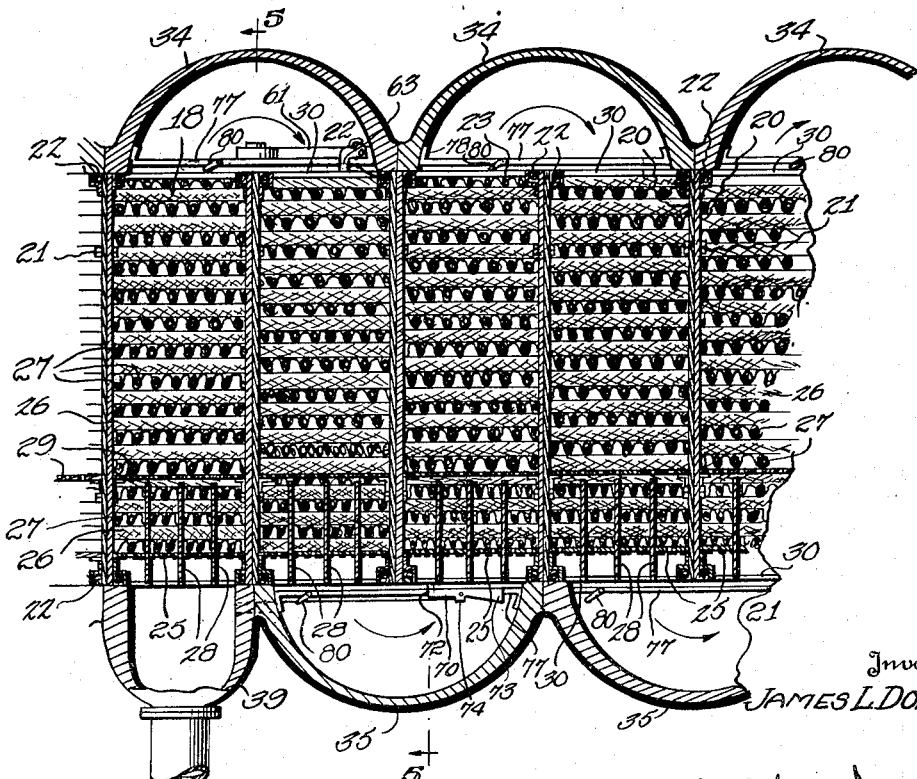

In the drawings I have shown one embodiment of the invention. In this showing,

Figure 1 is a plan view,

Figure 2 is an enlarged fragmentary plan view of the casing members and rotatable element with the covering removed, Figure 3 is a side elevation, Figure 4 is an enlarged vertical sectional view taken substantially on line 4—4 of Figure 1, Figure 5 is an enlarged sectional view taken substantially on line 5—5 of Figure 4, Figure 6 is a similar view on line 6—6 of Figure 1, Figure 7 is a top plan view of one of the cells, Figure 8 is a bottom plan view of the same, Figure 9 is a detail perspective view of a portion of the actuating means for the operating elements, and, Figure 10 is a detail perspective view of one of the pawl control members.

Referring to Figures 2, 5 and 6, the numerals 10 and 11 designate inner and outer walls respectively of a substantially circular casing, the walls referred to being concentric, as will be apparent. The inner faces of these walls are preferably machined for a purpose to be described. The upper and lower edges of the outer wall 11 are provided with outstanding flanges 12 and 13 respectively, while the upper and lower edges of the wall 10 are similarly provided with flanges 14 and 15 respectively, the flanges 14 and 15 being provided at spaced points with extensions 16 and 17 respectively for a purpose to be described.

A plurality of cells 18 is mounted in the annular space between the walls 10 and 11, the inner and outer ends of these cells being curved as at 19 to conform to the curvature of the casing walls. The inner and outer walls of the cells contact lightly against the walls 10 and 11 as will be obvious. The cells are open at their tops and bottoms as indicated in Figure 4, and are provided with side walls 20 which are radial with respect to the walls 10 and 11. When the cells are assembled, they completely fill the annular space between the walls 10 and 11 and are preferably bolted together as at 21 to form a single rotatable unit. Each cell is provided at the top and bottom of its side wall 20 with transverse packing elements 22 arranged in channels 23. Similarly, the extremities of the inner and outer walls 19 are provided with packing 24 adapted to engage against the inner surfaces of the walls 10 and 11. Thus leak-proof joints may be provided around the cells at their forward and rear edges, transversely of the annular chamber. The method is practiced at atmospheric pressure throughout the apparatus, and accordingly the packing elements need only lightly engage the surfaces with which they contact in order to provide sufficiently leak-proof joints.

Each of the cells is preferably provided at a point slightly spaced from its bottom with reticulated plates 25 adapted to support a plurality of supports 26. These supports preferably are in the form of corrugated wire mesh sheets, the undulations of successive sheets being arranged at right angles to each other. The spaces formed by the lower corrugations are provided with carriers 27 which are impregnated with the catalytically active material previously referred to. The supports 26 are preferably made of the same material as the catalyst so that their surfaces will be catalytically active and will take part in the process.

As the catalytic agent, I have found iron, copper, cobalt, silver and especially nickel, used either singly or in conjunction with each other, to work well, but the invention is not in any sense limited to the use of any particular catalytic agent since satisfactory results have been secured with other metals. In making up the carriers and their associated catalysts, I preferably saturate large loosely woven cords of asbestos or similar material, used as the carrier, with a suitable solution of a salt of the metal catalyst to be employed. For example, the carriers may be saturated with nickel nitrate, which may be dried and heated to reduce the metallic salt to nickel oxid. The carrier with the nickel oxid impregnated therein then may be treated, as with hydrogen, to reduce the oxid to metallic nickel and water vapor which latter passes off. The metallic nickel thus deposited is catalytically active, and while other metals may be employed, nickel has been found to work very advantageously, and accordingly the carriers 27 preferably are impregnated with this metal.

Each cell is preferably provided with a plurality of spaced vertical baffle plates 28, extending upwardly some distance from the bottom of the cell. These plates extend between the reticulated plates 25, which are supported at their ends in any suitable manner against the inner and outer walls 19 of the cell. Necessarily, the corrugated sheets 26 lying between the plates 28 are made in narrow sections, while those above the plates 28 may be equal in width to the width of the cell. The plates 28 are made of thin material so as to occupy a minimum space, and a second reticulated plate 29 preferably is arranged slightly above the upper edges of the plates 28 of each cell for supporting the upper corrugated sheets 26 and their carriers 27 to prevent the weight of these elements from being carried on the upper edges of the plates 28.

Means to be described, including operating pawls, are adapted to effect intermittent movement of the rotatable member comprising the cells 18. Coacting means are associated with the cells whereby the intermittent movement may be imparted. Referring to Figures 5, 7 and 8, the numeral 30 indicates a pair of bars connected between the side walls of each cell 18 adjacent its upper end. These bars are connected adjacent the rear edge of each cell by a cross bar 31. Similarly, rods or bars 32 are connected between the side walls of each cell at the bottom edge thereof, and these bars are connected by a cross bar 33 which is arranged adjacent the side of the cell opposite the cross bar 31, for a purpose to be described.

The three stages of the cycle of operation of the apparatus take place during each complete revolution of the rotatable member. Each stage of the casing is provided with a plurality of hoods 34 constituting return bends each of which communicates with the upper ends of two of the cells 18, as shown in Figure 4. Similarly, a plurality of return bends 35 is provided at the bottom of the casing, and each communicates with the lower ends of two of the cells. The return bends 34 and 35 are staggered from each other to form a continuous passage through a plurality of cells. In the present instance, each stage of the operation includes eleven of the cells in each of the continuous passages referred to. For the sake of illustration, thirty-six of the cells have been illustrated, and since each stage includes eleven cells, there will be three remaining cells which may be termed "dead cells" which will be arranged between the active stages for a purpose to be described. It will be apparent that the invention is not limited in any sense to the use of a particular number of cells.

As previously stated, there are three stages of operation which take place in the apparatus, and these stages are represented in Figure 1 of the drawings by numerals 36, 37 and 38 respectively. In the stage 36, gasoline vapors are passed through the passage represented by the cells and by the return bends 34 and 35, and these vapors contact with the metallic catalyst to take up the sulfur therein. In the stage 37, the spent catalyst, which is largely in the form of metallic sulfide is subjected to the action of heated air to form sulfur dioxid gas and metallic oxid, while in the third stage 38, the metallic oxid of the metal is subjected to the action of hydrogen to reduce the oxid to metallic form, the water vapor thus produced by the combination of the hydrogen and the oxid of the metallic oxid being carried off.

At the beginning of the stage 36, a single hood 39 communicates with the first cell of the passage included in this stage, and a pipe 40 communicates with this hood to permit the introduction of vapors thereinto. When the apparatus is used for the purpose of desulfurizing gasoline, the pipe 40 communicates with a still in which the gasoline vapors are generated. Obviously, these gases are heated, and if desirable or necessary, preheating means may be employed for elevating the gasoline to a proper temperature before supplying it to the hood 39. At the outlet end of the stage 36 a single hood 41 covers the upper end of the last cell 18 of this stage and communicates with an outlet pipe 42 leading to a suitable condenser. The vapors passing from the pipe 42 are substantially free from sulfur, and accordingly the finished product condensed from these vapors will be of relatively high quality.

The various stages, so far as their structures are concerned, are identical and all need not be referred to in detail. The inlet hood of the stage 37 is supplied with hot air through a pipe 43, while the sulfur dioxid and excess hot air passes from the stage 37 through a pipe 44. Similarly, hydrogen is introduced into the inlet hood of the stage 38 through a pipe 45 and water vapors produced by the combination of the hydrogen with the oxygen of the metallic oxid passing through the stage 38, is withdrawn therefrom, together with excess hydrogen through an outlet pipe 46. Obviously, the water vapors passing from the pipe 46 may be condensed to permit the excess hydrogen to be used again.

As previously stated, one "dead" cell is arranged between each adjacent pair of stages 36, 37 and 38, the position of such dead cells being represented by the numerals 47. These dead or inactive points are provided so that successive cells may be passed out of operation temporarily before passing to the next stage of the process to permit an inert gas to be passed through successive cells to remove the gases or vapors therein. This action is deemed necessary to prevent any possibility of an explosion as, for example, would possibly occur if the first cell of the stage 36 should be immediately passed through the stage 37 to be subjected to the action of hot air therein.

Each dead point is provided with top and bottom hoods 48 and 49, as shown in Figure 6. These hoods, and all of the various hoods and return bends are provided with outstanding flanges 50 and 51 which may be secured to the flanges 12, 13, 14 and 15 by bolts 52 or other securing elements. As the inert gas, referred to above, carbon dioxid may be employed, and this gas may be fed into each bottom hood 49 through a supply pipe 53. The inert gas, and other gases or vapors blown from each inert cell, may be carried from each hood 48 to an outlet pipe 54. Valves 55 are arranged in the pipes 53 and 54 and their stems may be connected by a rod 56 to permit simultaneous operation of the valves. Each rod 56 is provided with a crank 57 adapted to be operated in a manner to be described whereby the valves 55 are closed during each rotative movement of the rotatable member and are open while the rotating element remains at rest.

The first return bend at the top and bottom of each stage projects inwardly beyond the inner wall 10 as indicated at 58. These inwardly projecting portions lie against the flange projections 16 and 17, previously referred to. The flange projections are each provided with packing glands 59, and a vertical shaft 60 passes through the corresponding packing glands. Obviously, the upper and lower extensions 58 are offset from each other because of the staggered relation of the return bends 34 and 35, but they overhang to a certain extent whereby the shaft 60 is provided with an arm 61 extending into the corresponding return bend 34 and a projection 62 extends from one side of the arm 61 and is preferably formed integral therewith. A pawl 63 is pivotally connected to the projection 62 as at 64, and is provided with an overhanging portion 65 to limit its downward movement. A lateral projection or pin 66 is formed integral with the pawl and projects therefrom, and is preferably provided with a bevelled face 67 for a purpose to be described. The arm 61 swings in the direction of the arrow shown in Figure 9 to effect movement of the rotatable member comprising the cells 18. and during this movement, the finger of the pawl 63 engages the cross bar 31.

An outstanding arm 68 is carried by the lower end of each shaft 60 within the corresponding return bend 35 and this arm extends to one side at its extremity, as at 69. A pawl 70 is pivotally connected to the portion 69 of the arm 68, as at 71, this pawl having an engaging finger 72 at one end, and a counter-weight 73 at the opposite end. The outer portion of the arm 68 is provided with a projection 74 lying beneath the counter-weight 73 to limit its downward movement. A pin or projection 75, similar to the projection 66, is carried by the counter-weight 73 and is provided with a bevelled face 76. When the arm 68 swings in the direction previously referred to, the finger 72 engages the cross bar 33 at the bottom of one cell to effect rotating movement of the rotatable member. The swinging movement of the shaft 60 and its arms 61 and 68 is such that the pawl will travel a distance equal to the width of one cell. Thus, at each actuation of the shaft 60, the rotatable element will be moved a step equal in distance to the width of one cell. The function of the counterweight 73 is to normally hold the finger 72 in upward or operative position.

As previously explained, the projections 58 are staggered with respect to each other. Because of the arrangement of the return bends in which the arms 61 and 68 operate therefore, it is necessary to arrange these arms at slightly different angles. The starting positions of the pawls 66 and 75 are shown in Figure 4 of the drawings, and since the upper pawl moves to a point adjacent one wall of the corresponding return bend 34 at the beginning of its stroke, the finger of the pawl is arranged preferably beneath the extremity of the arm 61 to permit the pawl to approach the wall of the return bend 34 referred to. Thus, the cross bar 31 is arranged only a sufficient distance from the adjacent side wall of each cell to permit its engagement with the finger of the pawl 63. On the other hand, the pawl finger 72 starts from a point remote from either side wall of its corresponding return bend 35, and thus the pawl finger may be arranged in advance of the arm 68.

Means is provided for moving the pawl fingers out of the plane of the cross bars 31 and 33 upon return movement of the pawls, during which time they pass over but do not contact with the packings at the upper and lower ends of the cells. Referring to Figures 5 and 10, the numeral 77 designates the pawl control plate arranged in each upper and lower return bend 34 corresponding with the arms 61 and 68. These plates are substantially identical and only one need be referred to in detail. Each plate 77 is provided with angular ends 78 adapted to be secured to the return bends to secure them in position. Intermediate its ends, each plate is provided with a laterally extending portion 79 above and below which one of the projections 66 or 75 travels, depending upon the direction of movement of the arms 61 and 68. During the working stroke of each pawl, its projection travels beneath the extension 79 until it reaches a point adjacent the end of its movement, whereupon it lifts a pivoted pawl 80 arranged at one end of the projection 79. Upon the beginning of the return stroke, the projection of either pawl 66 or 75 travels upwardly over the pawl 80, and thus will be supported upon the top of the projection 79 during its return travel. Adjacent the pawl 80, the metal of the projection 79 is turned downwardly slightly as at 81 to prevent the projection from catching upon the projection 79 as it slides upwardly over the pawl 80. One of the pawl projections is shown in dotted lines in Figure 10 of the drawings, and it will be apparent that its angular face 67 is adapted readily to slide upwardly over the pawl 80. Immediately before the return movement of the projection is completed, it drops over the end of the projection 79 opposite the pawl 80. It will be apparent that both of the projections 66 and 75 move downwardly as their respective pawl fingers engage the cross bars 31 and 33, the projection 66 being carried directly by its pawl, while the projection 75 is carried by its counter-weight. Thus, when either of these projections is supported upon its corresponding opposite portion 79 of the plate 77, the corresponding actuating pawl will be moved completely out of engagement with its cross bar 31 or 33, and clear of the packing members 22, and thus no damage will be done thereto.

It is preferred that friction reducing means be employed for supporting the rotatable member within the annular space between the plates 10 and 11. For this purpose, I have illustrated housings 82 arranged adjacent the front and rear walls of each cell, and in which are arranged rollers 83 journalled upon stub shafts 84. These rollers are adapted to travel upon an inwardly extending flange 85 carried by each plate 10 and 11. The weight of the rotatable member thus being supported substantially free from friction, it may be readily rotated with a slight expenditure of power.

A shaft 86 is vertically arranged centrally with respect to the plates 10 and 11, as shown in Figure 1. This shaft may be supported in any suitable bearings and is provided with a wheel 87 carrying three sets of segment teeth 88 thereon. If desired, the wheel 87 may be ring gear instead of being provided with a plurality of segment gears as shown. Each set of teeth 88 meshes with a segment gear 89 mounted upon one of the shafts 60. Thus periodic oscillation of the shaft 86 is adapted to effect periodic rotation of the rotatable member through the medium of the pawls 66 and 75 and their associated mechanisms.

An arm 90 is connected at one end to the shaft 86 and is pivotally connected at its opposite end as at 91 to one end of a link 92. The opposite end of this link is pivotally connected as at 93 to the outer end of a piston rod 94 connected to a piston 95 operable in a cylinder 96. Any suitable means such as a clock work mechanism, may be employed for periodically admitting fluid pressure to the cylinder 96 to effect one complete reciprocation of the piston, and thus effect one oscillation of the shaft 86 and wheel 87.

Each segment gear 89 is provided adjacent opposite ends with pins 97 and 98 projecting upwardly therefrom and adapted to engage an arm 99 having a collar 100 at its inner end rotatably surrounding the shaft 60 and supported by the head of the corresponding gear 89. A link 101 is connected between each arm 99 and the arm 57 of the corresponding valve operating rod 56.

The operation of the apparatus is as follows:

The apparatus has been described as being particularly adapted for use in desulfurizing gasoline, but it will be apparent that it is adapted for use in practicing other cyclic chemical reactions. When employed for desulfurizing gasoline, the vapors from the still, preheated if necessary, are fed into the hood 39 through the pipe 40. These vapors pass upwardly through the first cell 18, through the first top return bend, and thence downwardly through the second cell, and this operation is continued until the purified vapors flow outwardly through the pipe 42. As previously stated, the entire apparatus is preferably operated at substantially atmospheric pressure, and the temperatures of the various stages range from 150 to 400° C. depending upon the catalytic material employed. It is preferred however, that the temperature range lie between 250 and 350° C., and when nickel is employed as the catalytic agent, the preferred temperature in the stage 36 will be approximately 350° C. This temperature will be below the cracking temperature of the gasoline, and accordingly the latter will be unaffected except that the sulfur will be extracted therefrom. The gasoline vapors pass through the reticulated members 25 and 29, and through the wire mesh plates 26, coming into intimate contact with the carriers 27 and the catalytic agent impregnated thereinto. It has been found that any of the materials previously referred to may be employed as the catalytic agent, but it is preferred that nickel be employed. Under the temperature conditions referred to, it has been found that the sulfur content of gasoline may be reduced to .04 per cent.

It is preferred that the rotatable member remain stationary for approximately five minutes between the movement thereof. The movement of the various gases and vapors throughout the apparatus is in a counter-clockwise direction as viewed in Figure 1, while rotation of the cells takes place in a clockwise direction whereby the operation of the apparatus is of the counter-current type. Obviously, the cell 18 nearest the intake pipe 40 will contain the highest percentage of metallic sulfid, and at each successive movement of the rotatable member, this first cell is detached, in effect, from the stage 36, thus bringing the second cell into first position. The cell thus moved from the stage 36 is brought into the first inert position, adjacent the pipe 40, and an inert gas is blown therethrough to remove the gasoline vapors therefrom. Thus all traces of gasoline vapor will be removed from the cell referred to before the next movement of the rotatable member takes place whereupon the cell will be transferred to the stage 37 wherein the oxidation of sulfids takes place.

In the oxidation stage 37, the flow of the hot air introduced into pipe 43 and discharged into pipe 44 is similar to the flow of the gasoline vapors in the stage 36. The oxygen of the hot air reduces the metallic sulfid forming sulfur dioxid gas and the oxid in the metal. The oxid remains in the cells while the sulfur dioxid gas passes from the pipe 44 together with the excess air. Each successive movement of the rotatable member moves the successive cells into the second inert position 47 whereupon inert gas is blown through the cell to remove the air and sulfur dioxid gas.

Thus, the catalytic agent passing into the third stage 38 will be in the form of the oxid, and in this stage, hydrogen is supplied through pipe 45 and withdrawn through pipe 46. The hydrogen combines with the oxygen of the oxid to form water vapor which passes out of the pipe 46 together with the excess hydrogen, thus leaving the catalytic agent in metallic form to be transferred to the stage 36.

The operation of the step by step mechanism will be apparent from the foregoing description, it being apparent that the pawls 63 and 75 simultaneously engage the cross bars 31 and 33 to effect movement of the rotatable member. The bars 30 and 32 are arranged a sufficient distance apart to permit the arcuate movement of the arcuating pawl. The normal position of the arcuating pawls is at the end of their working stroke, the return stroke not taking place until the next successive rotating movement of the cells is to take place. After the return movement of the pawls is started, the pins 98 will engage their corresponding arms 99 to swing the arms 57 and rods 56 and thus close the valves 55 controlling the movement of the inert gases. Upon the working stroke of the pawls, the segment gears 89 will start moving in the opposite direction, and near the end of the working stroke, the pins 97 will engage the arms 99 to reopen the valves 55. Thus the supply of inert gas will be cut off substantially during the entire time when the rotatable member is moving and will be turned on when the rotatable member comes to rest for the continuation of the operation of the process.

It is not desirable that the vapors passing through pipe 40 be turned on intermittently as is the inert gas, and in order to prevent the vapors from moving from one lower hood or return bend directly to the next, while the rotating element is being moved to successive positions, the baffle plates 28 are provided. These plates tend to direct the movement of the vapors during the turning movement of the rotatable member, and their lower edges preferably lightly contact with the inner edges of the lower hoods and return bends during rotating movement of the cells.

The oxidizing action in the stage 37 preferably takes place at approximately 280° C., but may take place within the temperature ranges previously referred to. It is preferable that the temperatures be maintained sufficiently low to prevent sintering in the oxidation and reduction stages and cooling means may be employed if desired.

From the foregoing it will be apparent that the apparatus is continuous in its operation and is self regenerative, and thus the process may be practiced economically. The results obtained are far in excess of those obtained with present known processes, and a higher grade resulting product is obtained at a lower cost.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a closed circular casing divided into first, second and third stages of operation, a rotatable member in said casing comprising a plurality of cells each adapted to contain a material capable of acting on a fluid and to be changed by such action, means for passing a fluid through the cells of the first stage, means for rotating said member to move successive cells through said stages, means for passing a fluid through the cells of the second stage substantially simultaneously with the passing of the fluid into the first stage for altering said material as it passes through said second stage, and means for passing a fluid through the cells of the third stage substantially simultaneously with the passing of the fluids into the first and second stages for restoring the material to its original condition in the third stage.

2. Apparatus of the character described comprising a closed circular casing divided into first, second and third stages of operation, a rotatable member in said casing comprising a plurality of cells each adapted to contain a material capable of acting on a fluid and to be changed by such action, means for rotating said member to move successive cells through said stages, means cooperating with said cells forming a serial path through the cells arranged in each stage, means for feeding a fluid through the path formed by the cells in the first stage, means for feeding a different fluid through the path formed by the cells of the second stage substantially simultaneously with the feeding of the fluid in the first stage to alter the material therein, and means for feeding a fluid different from either of the other named fluids through the path formed by the cells of the third stage substantially simultaneously with the feeding of the fluids in the first and second stages to restore the material to its original condition.

3. Apparatus constructed in accordance with claim 2 wherein the means for rotating said member includes intermittently operable means for causing the rotation of said member to take place step by step.

4. Apparatus constructed in accordance with claim 2 provided with means for removing said fluids from the respective cells as they pass between said stages.

5. Apparatus constructed in accordance with claim 2 wherein the means for rotating said member is adapted to effect a step by step movement thereof, and means for removing said fluids from the respective cells as they pass between said stages.

6. Apparatus constructed in accordance with claim 2 wherein said casing is provided with intermediate points lying between each adjacent pair of stages and wherein successive cells are disconnected from said stages, and means for removing said fluids from successive cells as they lie in each of said intermediate points.

7. Apparatus constructed in accordance with claim 2 wherein the means for rotating said member is adapted to effect a step by step movement thereof equal to the width of one of said cells, said casing being provided with intermediate points lying between each adjacent pair of stages and wherein successive cells are disconnected from said stages, and means for removing said fluids from successive cells as they lie in each of said intermediate points.

8. Apparatus constructed in accordance with claim 2 wherein the means for rotating said member is adapted to effect a step by step movement thereof, means for passing an inert gas through successive cells as they pass between said stages to remove the fluids therefrom, and means for rendering said last named means inoperative during each successive movement of said rotatable member.

9. Apparatus constructed in accordance with claim 2 wherein the means for rotating said member is adapted to intermittently move said member by a step by step movement, means for passing an inert gas through successive cells as they pass between said stages to remove the fluids therefrom and including a control valve, and means operative upon movement of said member for momentarily closing said valve.

10. Apparatus for desulfurizing light hydrocarbons comprising a closed circular casing divided into first, second and third stages of operation, a rotatable member in said casing comprising a plurality of cells each adapted to contain a catalytic material adapted to act upon the hydrocarbon in vapor form to remove sulfur therefrom and to form principally a sulfide of the catalytic material, means for passing hydrocarbon through the cells of the first stage, means for simultaneously passing a gaseous medium through the cells of the second stage to oxidize the sulfur of the sulfid and to leave the catalytic material at least partially in the form of an oxid, means for simultaneously passing a gas through the cells of the third stage to reduce the oxidized catalytic material and restore such material to its original catalytically active condition, and means for rotating said member by a step by step movement whereby said cells are successively moved through said stages.

11. Apparatus constructed in accordance with claim 10 provided with means for passing an inert gas through each successive cell as it passes between said stages.

12. Apparatus of the character described comprising a closed annular container, a rotatable member arranged in said container, a rotatable shaft, a toothed annular member connected to said shaft and being circumferentially spaced from the inner wall of said container, a plurality of additional shafts arranged between the outer periphery of said toothed member and the inner wall of said container, a gear segment carried by each of said last named shafts and having their teeth meshing with said toothed member, connections between said last named shaft and said rotatable member, and means for intermittently rotating said first named shaft whereby said connections will move said rotatable member a predetermined distance.

13. Apparatus constructed in accordance with claim 12 wherein the ends of the connections engaging the rotatable member are releasably connected to the rotatable member, and means for releasing said ends after said rotatable member has been moved a predetermined distance.

14. Apparatus constructed in accordance with claim 12 wherein said rotatable member is provided with a plurality of compartments, each compartment being provided with means in which the free ends of the connections are releasably engageable, means for releasing said ends from one compartment after said rotatable member has been moved a predetermined distance, and means for moving said ends to engage another compartment.

In testimony whereof I affix my signature.

JAMES L. DORMON.